March 12, 1968     J. E. SCHOLL     3,372,466

METHOD OF MANUFACTURING LANDING MATS

Filed May 6, 1965

INVENTOR
JAMES E. SCHOLL

BY Claude Funkhouser

ATTORNEY

United States Patent Office 3,372,466
Patented Mar. 12, 1968

3,372,466
METHOD OF MANUFACTURING
LANDING MATS
James E. Scholl, Fairfax, Va., assignor to the United
States of America as represented by the Secretary
of the Navy
Filed May 6, 1965, Ser. No. 453,847
1 Claim. (Cl. 29—475)

ABSTRACT OF THE DISCLOSURE

A process of forming a metallic mat by simultaneously passing hot slabs of metal through opposed pattern forming rollers to form a pair of half mats, each having one flat and one corrugated side; feeding the half mats, with their corrugated sides in contacting relationship through pressurized rollers to weld the half mats together at all points of contact.

---

The invention described herein may be manufactured and used by or for the Government of the United States of America for governmental purposes without the payment of any royalties thereon or therefor.

This invention relates generally to a method of making prefabricated mat structures and more specifically to a method of making mats used as roadways for troops and mobile equipment being landed from floating craft in military operations.

In many military operations, and particularly in amphibious operations, it is necessary to provide light weight and quickly assembled prefabricated roadways in order to land troops and equipment. It is desirable to construct these roadways from prefabricated mat sections laid on the ground in interlocking relationship. The most desirable features in such a mat are the ability to withstand the stress and strain of heavy equipment passing thereover, the relative lightness of weight thereof, and the overall economy of construction.

In order to accomplish the above objects, the prior art shows devices of many designs and structural configurations. One of the most common patterns used in order to withstand the stress and strain of heavy rolling equipment, while still providing relatively light weight, is a waffle pattern. The commonly used devices of the prior art fabricate this waffle pattern by extruding the longitudinal ribs, and welding thereto the transverse ribs and the top and bottom plate structure, if such is to be used. A disadvantage of this method of manufacture is the relatively small number of manufacturing establishments which can produce this heavy extruded rib pattern and the few metals which lend themselves well to the extrusion process. A second disadvantage of the prior art devices is that it is extremely hard to gain uniform welding throughout the construction of the mat. This shortcoming leads to a mat which has a non-consistent section modulus. In the practice of the method of the instant invention, a mat of waffle pattern is constructed by hot rolling identical upper and lower half mat sections and then pressure welding these sections together along all longitudinal and transverse rib ends. The use of a rolling process results in a mat that is more readily manufactured, thus lowering the cost of production, and allowing the use of a much greater spectrum of metals, including aluminum and aluminum alloys.

It is an object of the present invention to provide a method for manufacturing a prefabricated mat structure which is inexpensive, strong and of light weight.

A further object of this invention is to provide a method of manufacturing a prefabricated mat of the waffle pattern type.

Other objects, advantages and novel features of the present invention will become apparent from the following detailed description when considered in conjunction with the accompanying drawings wherein.

Figure 1:
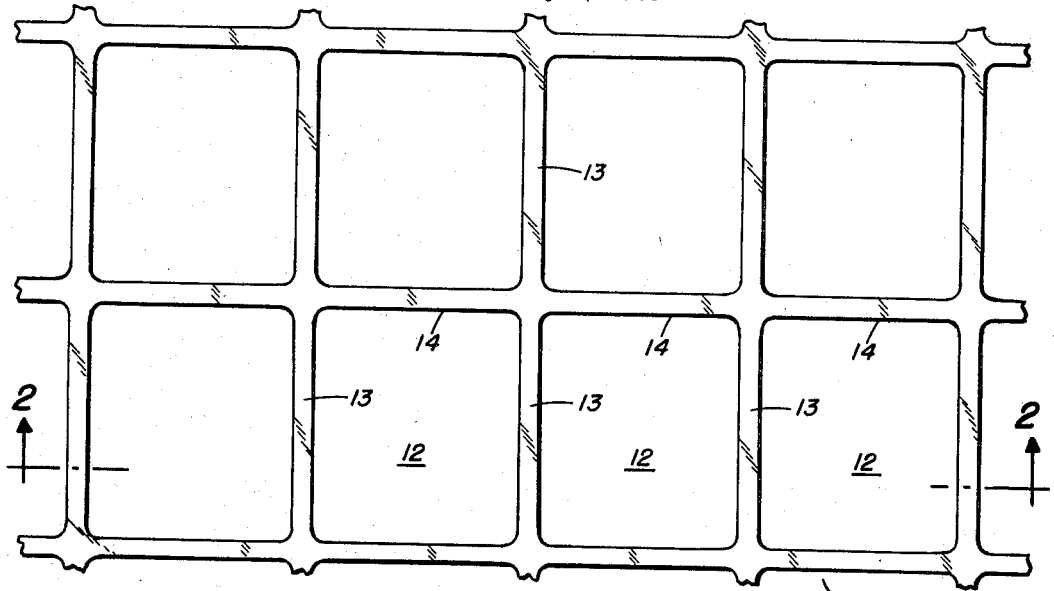
FIG. 1 is a top view of a portion of one of the halves of the mat constructed by the process of the invention.

The prefabricated mat constructed by the process of the instant invention consists of two identical halves, a lower half 10 and an upper half 11, which are pressure welded together to form a mat having an internal waffle pattern structure. A portion of the lower half mat section 10 is shown in FIG. 1. This construction is comprised of a base 12, transverse ribs 13 and longitudinal ribs 14. The pattern thus formed provides a mat which can withstand high stresses and strains by virtue of the optimum utilization of the structural mass of the material with respect to the radius of gyration in a manner well-known in the art as applied to T beams, but which is light in weight.

Figure 2:
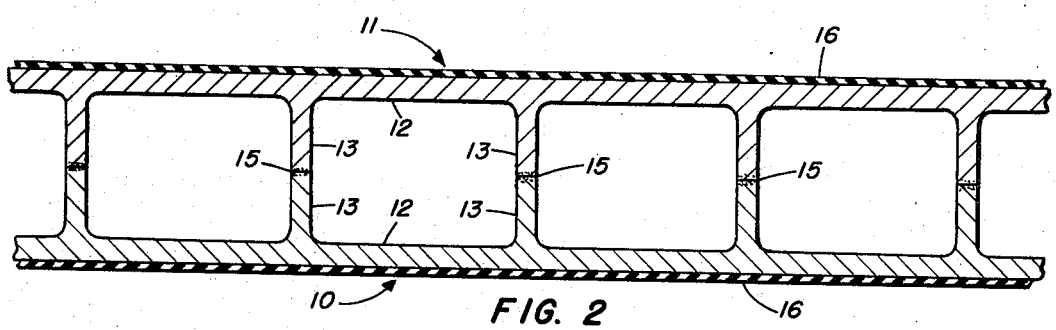
FIG. 2 is an elevation view taken along line 2—2 of FIG. 1.

As shown in the cross-section in FIG. 2, the two identical halves 10 and 11 cooperate to form a completed mat structure when pressure welded at 15. This weld preferably is on all the ribs, transverse and longitudinal. It may also be desirable to coat the upper and lower surfaces of the completed prefabricated mat with a non-slip material 16 or to construct a mat such that these upper and lower surfaces are of rough finish, but such forms no part of the invention. FIGS. 1 and 2 show only portions of the mat and it is within the scope of this invention to construct the mat sections in any desired shape. It is also desirable to provide at the end of any mat structures such as the instant type an interlocking feature so that several sections can be laid end to end and be attached together. The shapes of prefabricated mat structures as well as the methods for interlocking said structures are old and well-known in the art and also form no part of the instant invention.

Figure 3:
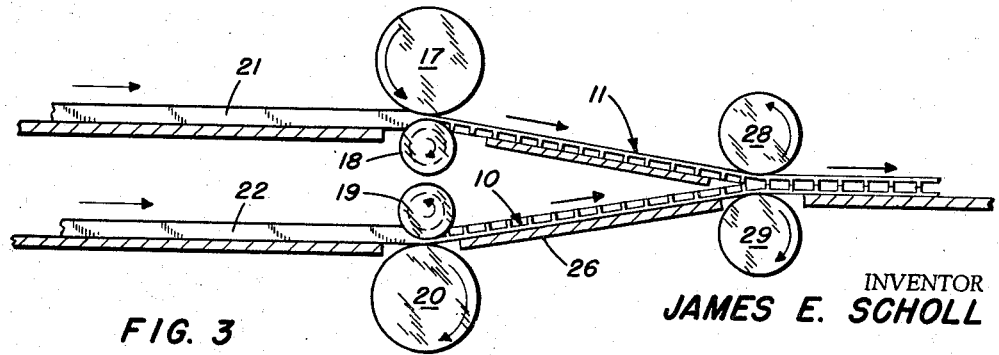
FIG. 3 is a diagrammatic view in elevation showing a preferred apparatus for manufacturing the prefabricated mat.

The instant invention, the method for producing the mat structure of FIGS. 1 and 2, is shown diagrammatically in FIG. 3. The apparatus consists of two sets of cooperating rollers, 17 and 18, and 19 and 20. Rollers 18 and 19 are the pattern elements and each has identical waffle patterns formed thereon. Rollers 17 and 20 provide the pressure for the hot rolling operation. The second part of the manufacturing process consists of pressure welding, which is done by rollers 28 and 29, cooperating to pressure weld the two sections received from the pattern forming rollers. The operation of the apparatus is obvious. Hot slabs of aluminum or other metal 21 and 22 are fed into the two sets of pattern forming rollers 17 and 18, 19 and 20, where the pattern is impressed. The mat sections 10 and 11 passed through the pattern forming rollers and moved to rollers 28 and 29 where the ribs 13 and 14 of each of the upper and lower sections are pressure welded together. Coordinated feeding of hot slabs 21 and 22, plus the intermeshing of the drive gearing of the various rollers insures that the ribs match up for the pressure welding.

The resulting mat structure is one of high strength and light weight, and one that lends itself well to manufacturing processes more economical than could be used in prior methods. Although only one form of the invention has been shown, it is to be understood that the invention may be embodied in various forms without departing from the scope of the appended claim.

What is claimed is:

1. A continuous process for manufacturing a metal landing mat, comprising:
   rolling two identical hot slabs simultaneously by opposed pairs of pressurized rollers to form hot identical waffle-like half mats having one corrugated side and one flat side, and arranged to discharge from the rollers with their corrugated sides inward;

feeding said half mats into coordinated contact so that the corrugations of one half mat contact the corrugations of its companion half mat in abutting relationship; and pressure rolling said hot half mats to weld said opposed half mats at all points of contact.

References Cited

UNITED STATES PATENTS 3,200,489  8/1965  Keeleric.

FOREIGN PATENTS 1,071   5/1855  Great Britain.
55,617  6/1937  Norway.

CHARLIE T. MOON, *Primary Examiner.*